(12) United States Patent
Amin (10) Patent No.: US 6,552,918 B1
(45) Date of Patent: Apr. 22, 2003

(54) SPACE-EFFICIENT POWER SUPPLY SYSTEMS AND METHODS WITH MINIMAL HEAT GENERATION

(75) Inventor: Dilip A. Amin, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/745,723

(22) Filed: Dec. 26, 2000

(51) Int. Cl.$^7$ ............................ H02M 1/12; G05F 5/00
(52) U.S. Cl. ............................ 363/40; 363/39
(58) Field of Search ............................ 363/65, 71, 39, 363/40

(56) References Cited

U.S. PATENT DOCUMENTS

| | | | | |
|---|---|---|---|---|
| 5,233,286 A | * | 8/1993 | Rozman et al. ............... | 363/37 |
| 5,359,275 A | * | 10/1994 | Edwards ..................... | 323/207 |
| 5,666,255 A | * | 9/1997 | Muelleman ................. | 361/111 |
| 6,023,037 A | * | 2/2000 | Church et al. ............... | 219/121.39 |
| 6,031,746 A | * | 2/2000 | Stiegerwald et al. .......... | 363/71 |
| 6,177,645 B1 | * | 1/2001 | Church et al. ............... | 363/65 |
| 6,178,101 B1 | * | 1/2001 | Shires ........................ | 363/39 |

* cited by examiner

Primary Examiner—Bao Q. Vu
(74) Attorney, Agent, or Firm—Harrity & Snyder, L.L.P.

(57) ABSTRACT

A space-efficient power supply powers a system and is housed in a small area of the system. The components of the power supply are designed to reduce heat generation and be aerodynamically efficient. Reduced heat generation reduces the need for air space around the power supply for cooling air, thus allowing the power supply to be housed in a small space. And because the components are aerodynamically efficient, space requirements are further reduced. In one embodiment the power supply is used in a system to power secondary power supplies. The secondary power supplies provide isolated power to components of a system, such as a communications system in an equipment box. In another embodiment, the power supply is used in an equipment box to power communications equipment distributed in the equipment box.

52 Claims, 6 Drawing Sheets

SPACE-EFFICIENT POWER SUPPLY SYSTEMS AND METHODS WITH MINIMAL HEAT GENERATION

BACKGROUND OF THE INVENTION

A. Field of the Invention

Apparatus, systems, and methods consistent with the present invention relate generally to supplying power and, more particularly, to apparatus, systems and methods for supplying power in a distributed system.

B. Description of Related Art

Conventional power supply systems for powering distributed systems typically include a main power supply and one or more secondary power supplies. In one type of power supply system, the main power supply receives non-isolated DC power, transforms the DC power, and provides isolated DC power to the secondary power supplies. The secondary power supplies provide the isolated power to respective components of a distributed system.

A drawback of this type of power supply system is that it takes a significant amount of space. The transformer in the main power supply generates significant heat, which must be cooled. This requires the use of large fans and space around the main power supply for airflow.

The air space near the main power supply must be sufficiently large enough to allow airflow across the components. The drag on the airflow caused by the components requires a larger space for the airflow.

A second type of conventional power supply system saves space by removing the transformer from the main power supply. The main power supply provides non-isolated power to the secondary supplies, requiring each secondary power supply to have a transformer for isolating the power from the system elements. Removing the transformer from the main power supply allows it to be housed in a much smaller volume. And it generates less heat, which further reduces the space requirements in the area immediately surrounding the main power supply.

While removing the transformer from the main power supply reduces heat, it does not eliminate the need for significant space. Even though the transformer is removed, the components of a conventional main power supply still generate significant amounts of heat and therefore require significant space for cooling. The removal of the transformer from the main power supply also does not address the need for space caused by the drag.

Therefore, there exists a need for apparatus and methods that supply power in a distributed system without the drawbacks of conventional systems.

SUMMARY OF THE INVENTION

Systems and methods consistent with the present invention provide a power supply in a small space. An apparatus consistent with the invention comprises a power receiving element for receiving input power having a first voltage, a power supply for filtering the input power and producing output power having a second voltage slightly lower than the first voltage, and a power supplying element for supplying the output power to a power-isolating element.

Elements of the power supply are optimized electrically so as to minimize the voltage drop between the input of the power supply and the output. Elements are also designed and arranged so as to minimize airflow disruption of airflow across the power supply.

The power supply can be used to power a secondary power supply which powers other components. In one embodiment, the power supply is used in an equipment box to power communications equipment.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. The following detailed description does not limit the invention. Instead, the scope of the invention is defined by the appended claims and equivalents of the claim limitations.

Systems and methods consistent with the present invention provide a space-efficient power supply system. The power supply system is comprised of a main power supply and one or more secondary power supplies. The main power supply provides non-isolated power to the secondary power supplies. The secondary power supplies receive the non-isolated power and provides isolated power to elements.

In one embodiment, the main power supply resides in a system air plenum of an equipment box. The components of the main power supply are designed and arranged so there is a small voltage drop from the input voltage to the output voltage of the main power supply. The small voltage drop results in a small amount of heat generation.

Additionally, the components of the main power supply are designed and arranged to minimize airflow disruption of the air drawn through across the main power supply components. Because the main power supply generates very little heat and imposes minimal drag on the airflow across the components, the volume of the space required for the main power supply can be minimized. Minimizing the volume required for the main power supply allows more room for other elements in the equipment box.

EXEMPLARY POWER SUPPLY SYSTEMS AND METHODS

Power supply systems and methods consistent with the principles of the invention supply power to a distributed system. Space efficiency is achieved by, for example, building the power supply system so that heat generation is minimized. Space saving is also achieved by building the power supply system so that the components impose minimal air drag on the air flowing across the main power supply components.

Figure 1:
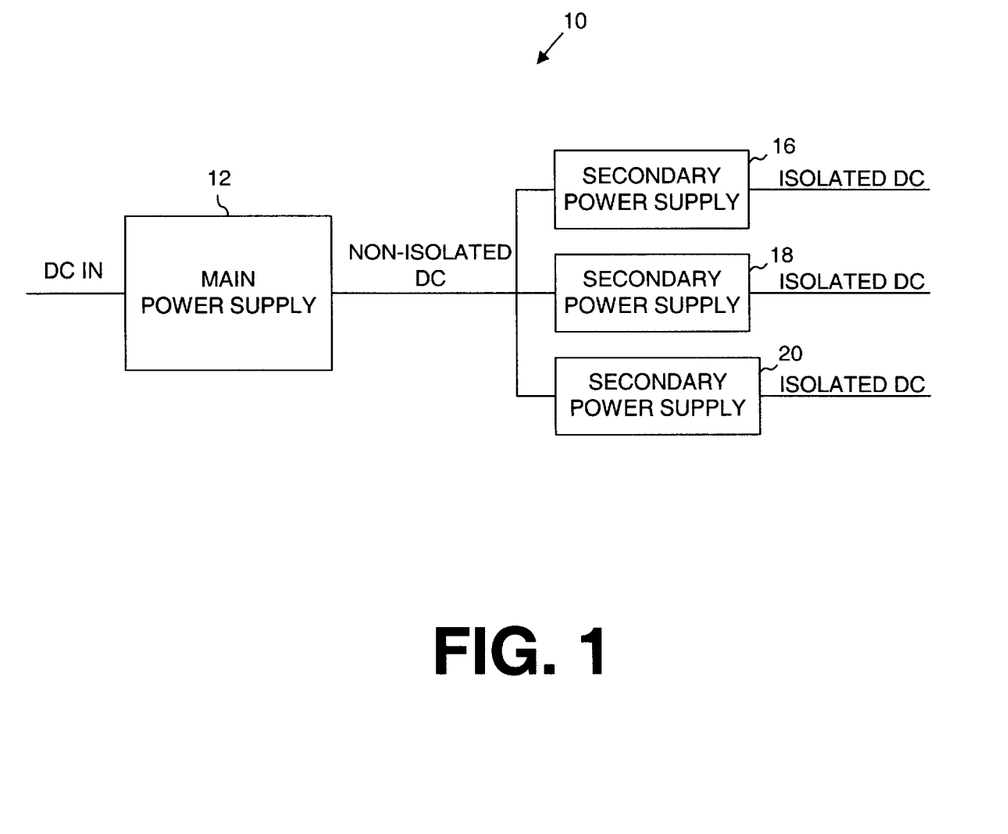
FIG. 1 is a diagram illustrating an embodiment of a power supply system consistent with the principles of the invention.

FIG. 1 is a diagram of an exemplary power supply system consistent with the principles of the invention. Power supply system 10 comprises a main power supply 12 connected to secondary power supplies 16, 18, and 20. Main power supply 12 preferably does not include a transformer, and therefore provides non-isolated DC power to secondary power supplies 16, 18, and 20. Secondary power supplies 16, 18 and 20 provide isolated DC power to elements of a distributed system.

Main power supply 12 is designed to occupy a small space, thus allowing more room for other elements of the system powered by power supply system 10. For example, the components of main power supply 12 are designed and arranged so that the voltage drop between the main power supply input and output is small. Minimizing the voltage drop results in less heat generation by main power supply 12. Because less heat is generated, main power supply 12 can be housed in a smaller area.

The components of main power supply 12 are also designed and arranged to minimize air drag on air drawn across the components, further reducing space requirements. For example, the components in main power supply 12 are shaped and oriented to minimize air drag caused by the components. Because airflow is optimized, main power supply 12 requires a smaller space than conventional power supplies.

Figure 2:
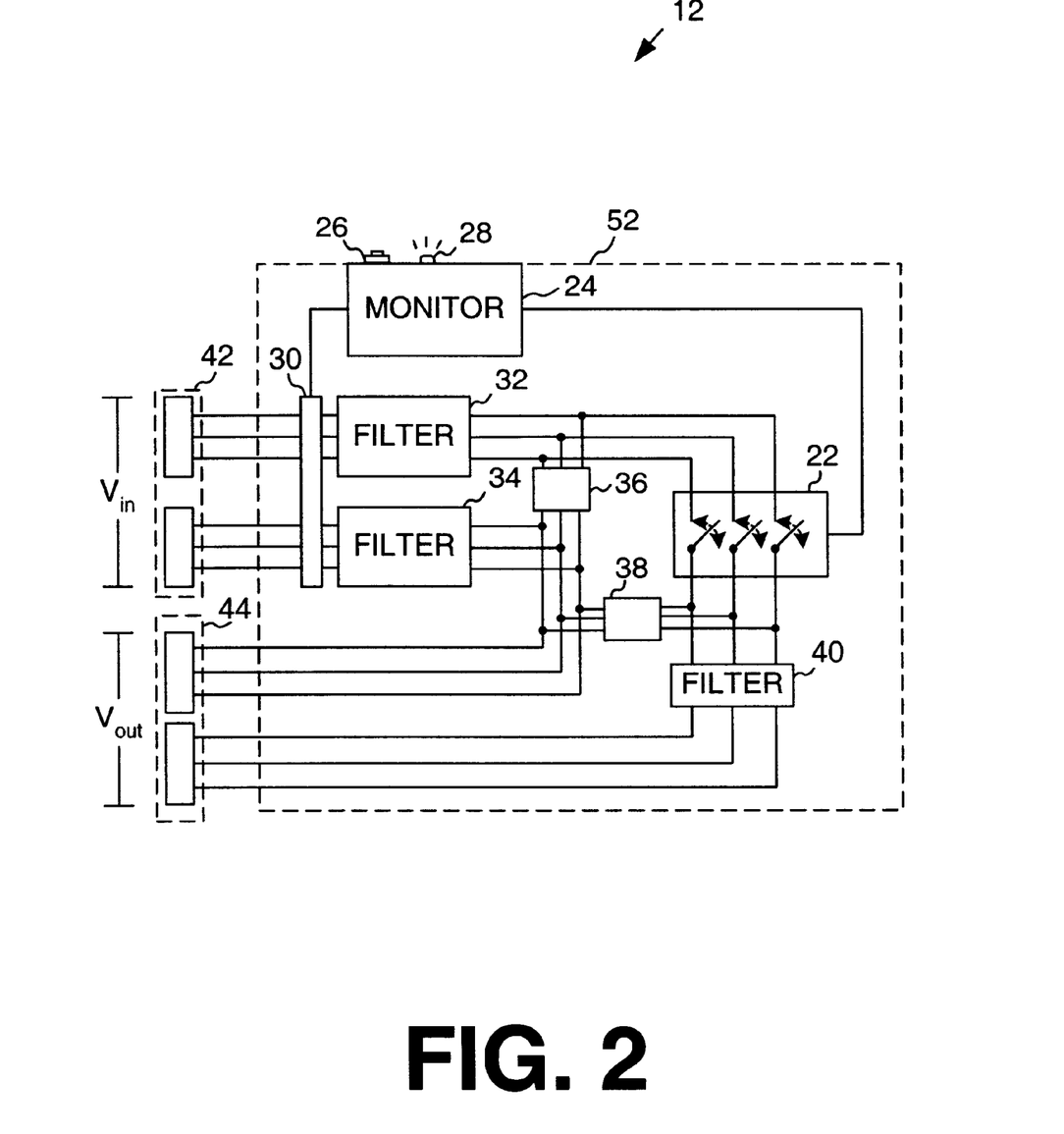
FIG. 2 is a diagram illustrating an embodiment of a main power supply consistent with the principles of the invention.

FIG. 2 is a block diagram illustrating an exemplary main power supply 12 consistent with the principles of the invention. Main power supply 12 includes DC in connectors 42, DC out connectors 44, and components 52. Components 52 comprise line sensor 30, filter 32, filter 34, capacitor 36, switches 22, capacitor 38, filter 40, monitor 24, test button 26, and light 28.

Main power supply 12 is designed to reduce heat generation by minimizing the voltage drop ($V_{in}-V_{out}$) between DC in connectors 42 and DC out connectors 44. For example, in an 80 amp system the voltage drop will be on the order of only several hundred millivolts. For example, one way the voltage drop is minimized is by reducing the electrical path length between DC in connectors 42 and DC out connectors 44. This may be accomplished by placing DC in connectors 42 in close proximity to DC out connectors 44. Because DC in connectors 42 and DC out connectors 44 are in close proximity, the electrical path length between the connectors is minimized, which minimizes the voltage drop of the path.

The length of each current-carrying path may be minimized in main power supply 12 by using parallel cables to carry the current. The smaller parallel cables are more flexible than a single large cable, allowing tighter turns, and therefore shorter path lengths, between DC in connectors 42 and DC out connectors 44. For example, as shown in FIG. 2, three cables are used between components in the path comprising DC in connectors 42, filter 34, and DC out connectors 44, and the path comprising DC in connectors 42, filter 32, switches 22, filter 40, and DC out connectors 44. Because the three cables are more flexible than a single large cable, the path between DC in connectors 42 and DC out connectors 44 can be tighter, and therefore shorter than if a single cable were used.

Voltage drop caused by switches 22 is also minimized as compared to using a single cable, single switch combination. Because three paths are switched, the voltage drop is effectively divided across the three switches, thus dropping the voltage by two-thirds as compared to a single cable, single switch combination.

Filters 32, 34, and 40 are also designed to minimize the voltage drop between DC in connectors 42 and DC out connectors 44. More particularly, filters 32, 34, and 40 have relatively large magnetic cores and a small number of windings. In one embodiment, each core has a single winding around the core. The combination of large magnetic cores and a small number of windings reduces the voltage drop caused by the filter.

Because the components of main power supply 12 are designed to minimize the voltage drop, the output voltage is only slightly less than the input voltage. Therefore, less heat is generated by the main power supply as compared to conventional systems. And because less heat is generated, less space is required for housing main power supply 12.

Monitor 24 is connected to line sensor 30 and provides safety features for main power supply 12. More particularly, monitor 24 monitors the voltage across DC in connectors 42 and opens switches 22 if the voltage is not within a proper operating range. This protects the system from over-voltage or under-voltage conditions.

Test button 26 is attached to monitor 24 and allows manual testing of main power supply 12. When test button 26 is pressed, light 28 turns on if safety switch 22 is closed, indicating the voltage on the DC in power lines is within the proper operating range and power is flowing through the supply. If the voltage is not within the proper operating range, light 28 will not turn on when test button 26 is pressed, indicating safety switch 22 is open and power is not flowing through the supply. Thus, monitor 24 provides under- and over-voltage protection, and allows a person to determine the state of main power supply 12, i.e., whether monitor 24 has tripped switches 22.

In one embodiment, the elements of main power supply 12 are partially or wholly integrated on a single integrated circuit. Integrating some or all of the elements on a single integrated circuit allows further size reduction of power supply 12 as compared to building the power supply with discrete components.

Figure 3:
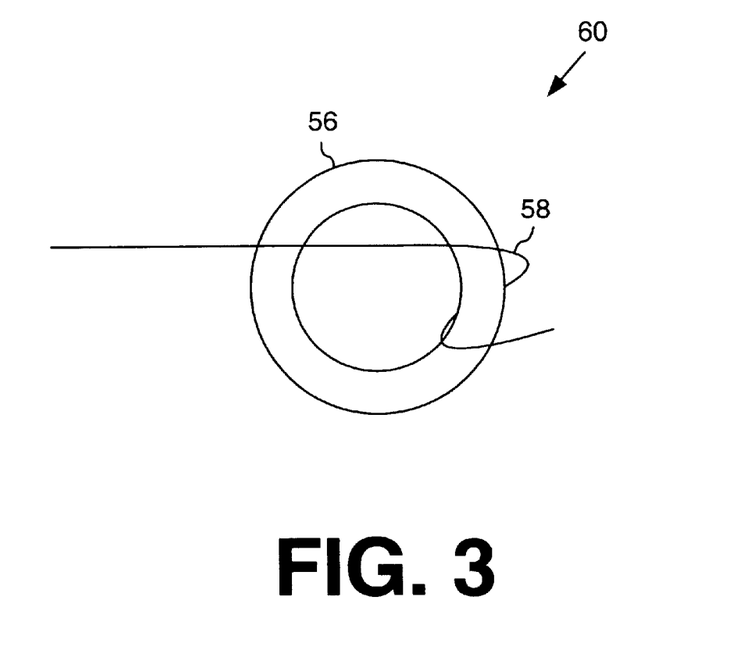
FIG. 3 is a block diagram showing a filter consistent with the principles of the invention.

FIG. 3 is a block diagram showing a filter 60, such as filter 32, 34, or 40 of FIG. 2, consistent with the principles of the invention. Filter 60 comprises a magnetic core 56 and windings 58. Filter 60 preferably has a large core and a small number of windings to reduce voltage drop caused by the filter. In one embodiment, windings 58 comprise a single winding around magnetic core 56.

Figure 4:
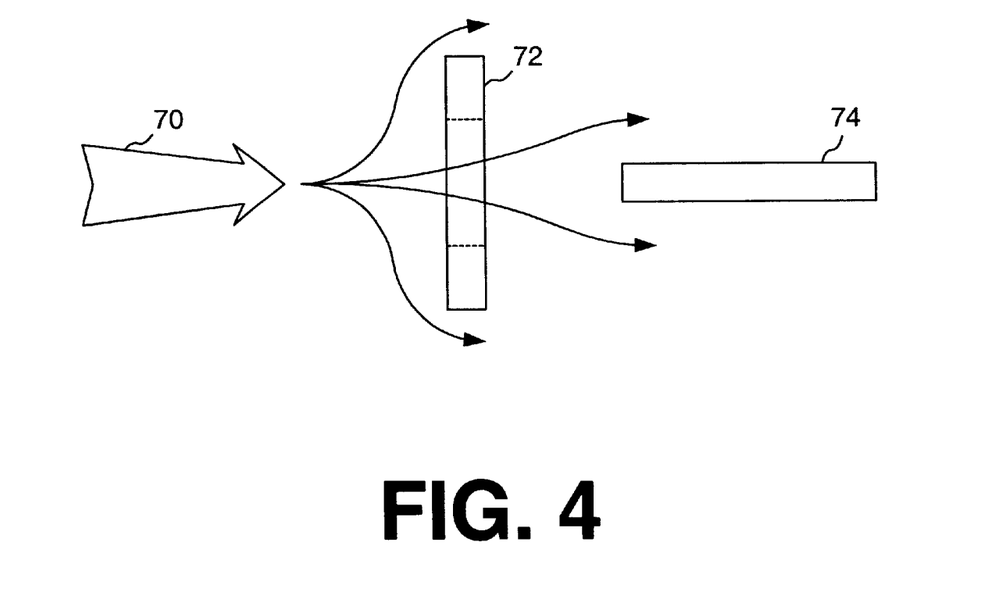
FIG. 4 is a block diagram illustrating airflow across main power supply components arranged consistent with the principles of the present invention.

FIG. 4 is a block diagram illustrating airflow across main power supply components designed and arranged consistent with the principles of the present invention. Components are designed to minimize air drag across the components. For example, components are shaped and oriented so as to be aerodynamically efficient, reducing space requirements for the main power supply. Reducing air drag allows the main power supply to be housed in a smaller space.

FIG. 4 illustrates one example of main power supply components arranged in a way that minimizes air drag caused by the components. More particularly, FIG. 4 shows a first core 72 oriented perpendicular to a second core 74. Airflow 70 hits first core 72, flows around the core and through its middle, and then across second core 74. By orienting the cores in this manner, air drag on airflow 70 is minimized, thus allowing the components to be housed in a smaller space. The shape of each core is also aerodynamically efficient. Other components of main supply 12 are also shaped and oriented relative to the airflow to minimize air drag on the airflow across the components.

Figure 5:
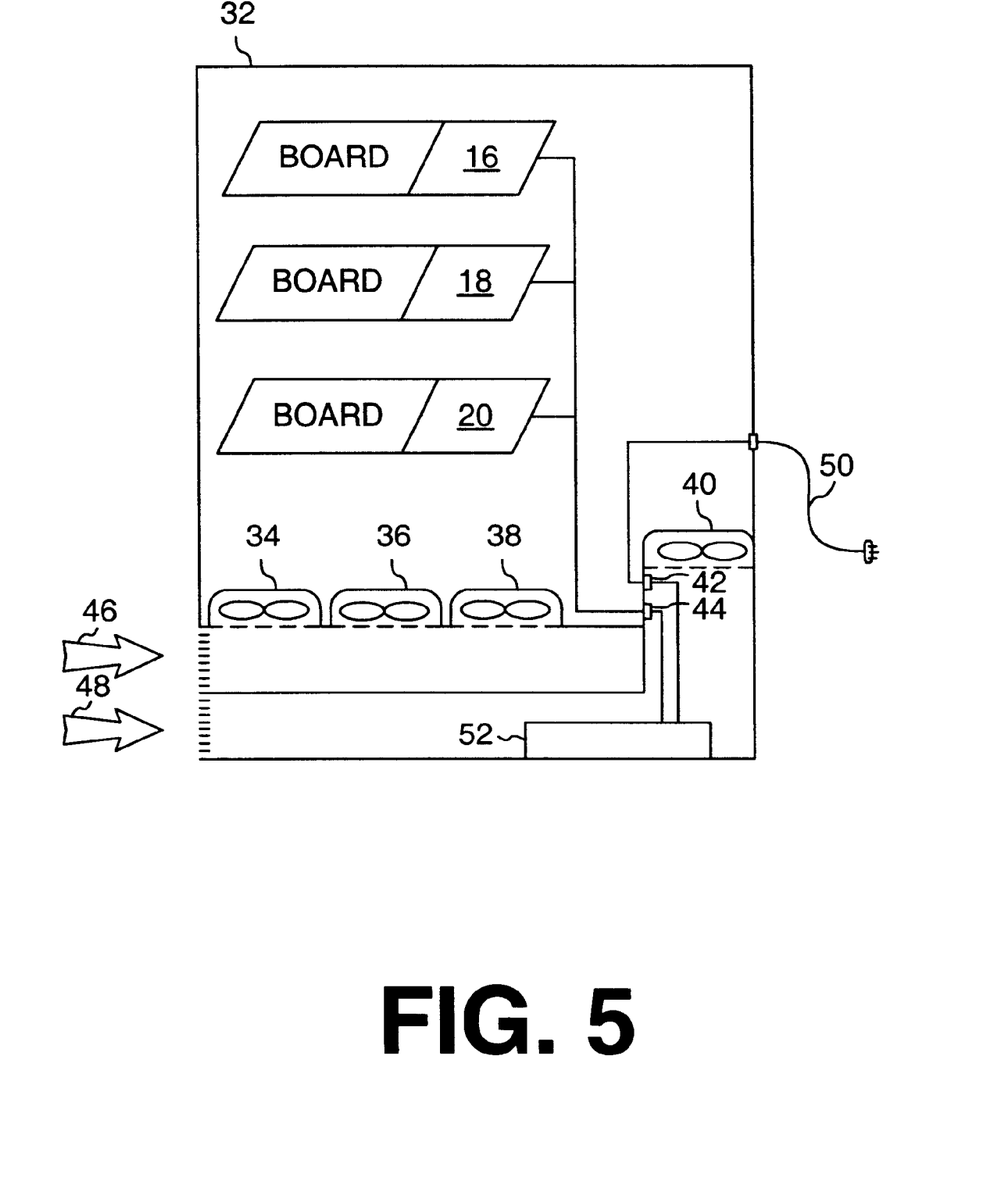
FIG. 5 is a diagram illustrating an equipment box utilizing a power supply system, consistent with the principles of the invention.

FIG. 5 is a block diagram illustrating an exemplary equipment box including a power supply system consistent with the principles of the present invention. Equipment box 32 comprises power supply components 52, DC in connectors 42, DC out connectors 44, power cable 50, secondary power supplies 16, 18, and 20, fan 34, fan 36, fan 38, and fan 40. Power supply components 52 represents components of a main power supply, such as the power supply components illustrated in FIG. 2, consistent with the principles of the invention.

Power cable 50 supplies DC power to equipment box 32. Power supply components 52 receive the DC power via DC in connectors 42 and provide non-isolated DC power to secondary power supplies 16, 18, and 20 via DC out connectors 44. Secondary power supplies 16, 18, and 20 provide isolated DC power to elements of equipment box 32. The elements shown in the embodiment of FIG. 5 are circuit boards respectively connected to receive isolated DC power from secondary power supplies 16, 18, and 20.

Equipment box 32 includes two airflows, upper airflow 46 and lower airflow 48. Fans 34, 36, and 38 pull upper airflow 46 into equipment box 32. Fan 40 pulls lower airflow 48 through an air plenum across power supply components 52 and into equipment box 32. Power supply components 52 generate a small amount of heat because the voltage drop between the DC in connectors 42 and the DC out connectors 44. Consequently, the temperature of the air drawn into the main cavity of equipment box 32 by fan 38 is close to the temperature of lower airflow 48. In one embodiment, equipment box houses communications equipment powered by power supply components 52.

Because power supply components 52 are designed to generate very little heat and be aerodynamically efficient, the plenum housing components 52 can be very small. This allows additional space for other elements of equipment box 32.

Figure 6:
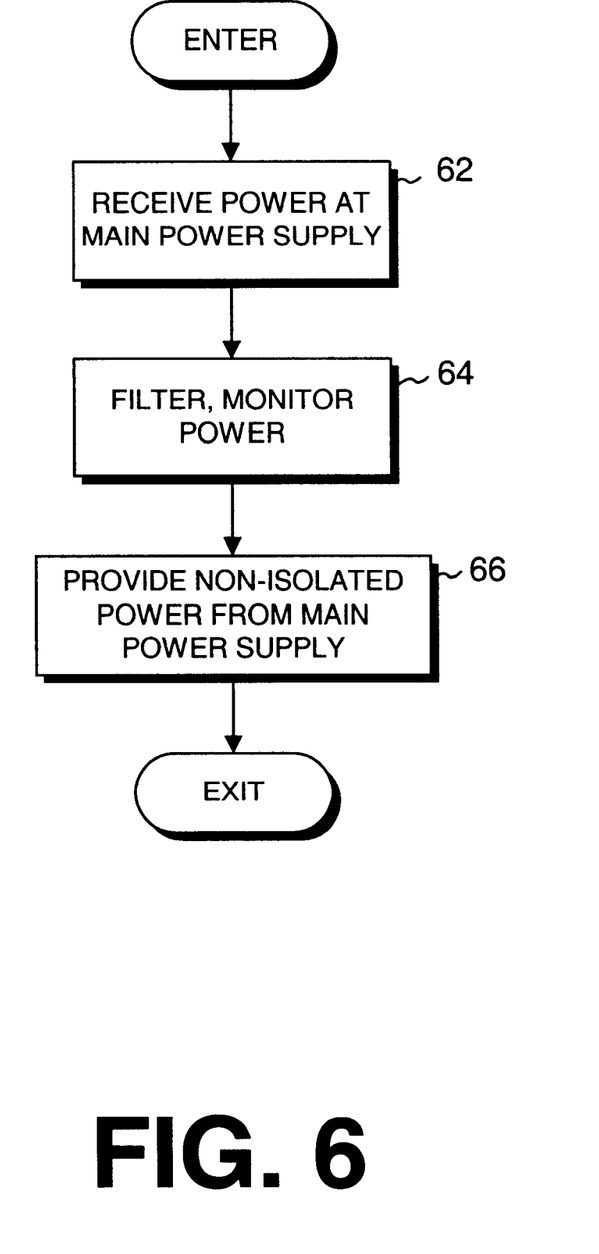
FIG. 6 is a flow chart illustrating a process performed by a main power supply, consistent with the principles of the invention.

FIG. 6 is a flow chart illustrating a process performed by a main power supply, such as the exemplary main power supply 12 illustrated in FIG. 2. Main power supply 12 receives DC power (step 62), filters and monitors the power (step 64), and then supplies the power as non-isolated DC power to the rest of the system (step 66).

Figure 7:
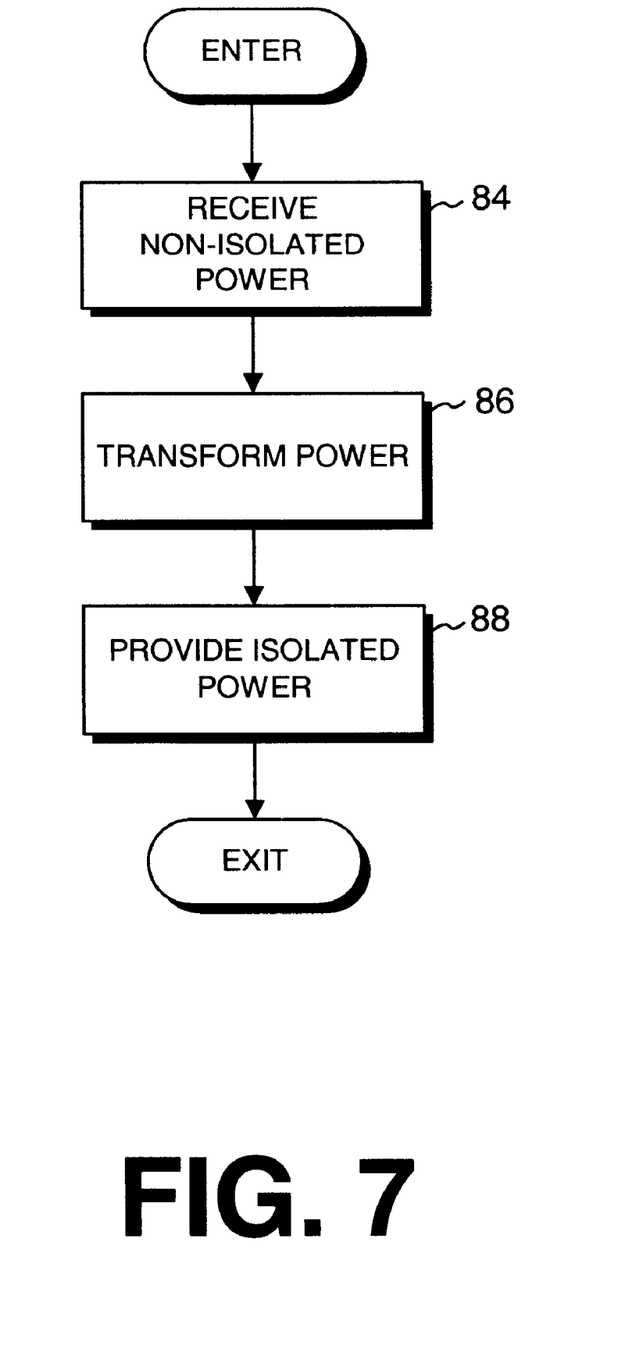
FIG. 7 is a flow chart illustrating a process performed by a secondary power supply, consistent with principles of the invention.

FIG. 7 is a flow chart illustrating a process performed by a secondary power supply, such as one of the exemplary secondary power supplies in FIG. 5. The secondary power supply, such as power supply 16, receives non-isolated power from main power supply 12 (step 84), transforms the non-isolated power (step 86) into isolated power, and provides the isolated power to one or more elements in equipment box 32.

CONCLUSION

Apparatus, systems, and methods consistent with the present invention provide a space-efficient power supply. In one embodiment the space-efficient power supply is used in a system to power distributed components, such as communications equipment components.

The foregoing description provides illustration and description, but is not exhaustive. The invention is not limited to the precise form disclosed. Modifications and variations are possible in light of the above teachings or may be acquired from practice of the invention. The scope of the invention is defined by the claims and equivalents of the claim limitations.

What is claimed is:

1. Apparatus for supplying power, comprising:
   a power receiving element for receiving input power having a first voltage;
   a power supply for filtering the input power and producing output power having a second voltage slightly lower than the first voltage; and
   a power supplying element for supplying the output power to a power-isolating element;
   wherein the power supply includes:
      a first electrical path comprising parallel cables for transmitting current from the power receiving element to the power supplying element, and
      a second electrical path comprising parallel cables connected between the power receiving element and the power supplying element, the first voltage and the second voltage being based on voltage between the first electrical path and the second electrical path at the power receiving element and the power supplying element, respectively.

2. The apparatus of claim 1, wherein the power supply comprises: first and second filters designed to minimize voltage drop caused by the first and second filters, the first filter being connected to the first electrical path and the second filter being connected to the second electrical path.

3. The apparatus of claim 2, wherein the first and second filters comprise:
   a magnetic core having a single winding.

4. The apparatus of claim 1, wherein the first electrical path includes parallel switches which when closed transfer current from the power receiving element to the power supplying element, and the second electrical path includes no parallel switches.

5. The apparatus of claim 1, wherein the power receiving element is positioned adjacent the power supplying element.

6. The apparatus of claim 1, wherein the power supply comprises:
   a first component designed to be aerodynamically efficient.

7. The apparatus of claim 1, wherein the power supply comprises:
   a component oriented in the power supply so as to optimize aerodynamics of airflow.

8. The apparatus of claim 1, further comprising:
   an air plenum for housing the power supply.

9. The apparatus of claim 8, further comprising:
   a fan for drawing air through the air plenum across the power supply.

10. A power supply system comprising:
    a power receiving element for receiving input power having a first voltage;
    a first power supply for filtering the input power having the first voltage and producing output power having a second voltage slightly lower than the first voltage;
    a power supplying element for supplying the output power; and
    a second power supply for receiving the output power and providing isolated power;
    wherein the first power supply includes:
       a first electrical path comprising parallel switches which when closed carry current over parallel current paths between the power receiving element and the power supplying element, and
       a second electrical path between the power receiving element and the power supplying element, the first voltage and second voltage being based on voltage between the first electrical path and the second electrical path at the power receiving element and the power supplying element, respectively.

11. The power supply system of claim 10, wherein the first power supply comprises:
a filter designed to minimize voltage drop caused by the filter.

12. The power supply system of claim 11, wherein the filter comprises:
a magnetic core having a single winding.

13. The power supply system of claim 10, wherein the power receiving element is positioned adjacent the power supplying element.

14. The power supply system of claim 10, wherein the first power supply comprises:
a first component designed to be aerodynamically efficient.

15. The power supply system of claim 10, wherein the first power supply comprises:
a component oriented in the first power supply so as to optimize aerodynamics of airflow.

16. The power supply system of claim 10, further comprising:
an air plenum for housing the first power supply.

17. The power supply system of claim 16, further comprising:
a fan for drawing air through the air plenum across the first power supply.

18. A power supply system housed in an equipment box, comprising:
a power receiving element for receiving input power having a first voltage;
a first power supply for filtering the input power having the first voltage using a filter designed to minimize voltage drop and produce output power having a second voltage slightly lower than the first voltage;
a power supplying element for supplying the output power; and
a second power supply for receiving the output power and providing isolated power to an element housed in the equipment box.

19. The power supply system of claim 18, wherein the filter comprises:
a magnetic core having a single winding.

20. The power supply system of claim 18, comprising:
a first electrical path comprising parallel cables for transmitting current from the power receiving element to the power supplying element; and
a second electrical path between the power receiving element and the power supplying element;
wherein the first voltage and second voltage are based on voltage between the first electrical path and second electrical path at the power receiving element and the power supplying element, respectively.

21. The power supply system of claim 18, comprising:
a first electrical path comprising parallel switches which when closed carry current over parallel current paths between the power receiving element and the power supplying element; and
a second electrical path between the power receiving element and the power supplying element;
wherein the first voltage and second voltage are based on voltage between the first electrical path and second electrical path at the power receiving element and the power supplying element, respectively.

22. The power supply system of claim 18, wherein the power receiving element is positioned adjacent the power supplying element.

23. The power supply system of claim 18, wherein the first power supply comprises:
a first component designed to be aerodynamically efficient.

24. The power supply system of claim 18, wherein the first power supply comprises:
a component oriented in the first power supply so as to optimize aerodynamics of airflow.

25. The power supply system of claim 18, further comprising:
an air plenum for housing the first power supply.

26. The power supply system of claim 25, further comprising:
a fan for drawing air through the air plenum.

27. A method for supplying power, comprising:
receiving at a power receiving element input power having a first voltage;
filtering the input power in a main power supply using a filter designed to minimize voltage drop and produce output power having a second voltage slightly lower than the first voltage; and
transmitting from a power supplying element the output power to a secondary power supply that isolates the output power.

28. The method of claim 27, including:
carrying current from the power receiving element to the power supplying element on a first path comprising parallel cables; and
carrying current from the power receiving element to the power supplying element on a second path;
wherein the first voltage and second voltage are based on voltage between the first path and second path at the power receiving element and the power supplying element, respectively.

29. The method of claim 27, including:
carrying current from the power receiving element to the power supplying element on a first path comprising parallel switches; and
carrying current from the power receiving element to the power supplying element on a second path;
wherein the first voltage and second voltage are based on voltage between the first path and second path at the power receiving element and the power supplying element, respectively.

30. The method of claim 27, including:
positioning the power receiving element adjacent the power supplying element.

31. The method of claim 27, including:
designing a first component of the main power supply to be aerodynamically efficient.

32. The method of claim 27, including:
orienting a component of the first power supply to optimize aerodynamics of airflow.

33. The method of claim 27, including:
housing the main power supply in air plenum.

34. The method of claim 33, including:
drawing air through he air plenum across the main power supply.

35. A method for supplying power comprising:
receiving at a power receiving element input power having a first voltage;
filtering the input power in a first power supply to produce output power having a second voltage slightly lower than the first voltage;
carrying current from the power receiving element to a power supplying element on first and second paths that each includes parallel cables, the first voltage and the second voltage being based on voltage between the first path and the second path at the power receiving element and the power supplying element, respectively;

supplying the output power from the power supplying element; and receiving the output power at a second power supply which provides isolated power.

36. The method of claim 35, including:

filtering the input power using a filter designed to minimize voltage drop.

37. The method of claim 35, wherein the first path includes parallel switches.

38. The method of claim 35, including:

positioning the power receiving element adjacent the power supplying element.

39. The method of claim 35, including:

designing a first component of the first power supply to be aerodynamically efficient.

40. The method of claim 35, including:

orienting a component of the first power supply to optimize aerodynamics of airflow.

41. The method of claim 35, including:

housing the main power supply in an air plenum.

42. The method of claim 35, including:

drawing air through the air plenum across the first power supply.

43. A method for supplying power in a power supply system housed in an equipment box, comprising:

receiving at a power receiving element input power having a first voltage;

filtering the input power in a first power supply and producing output power having a second voltage slightly lower than the first voltage;

carrying current on a first path between the power receiving element and a power supplying element that includes parallel switches for parallel current paths;

carrying current on a second path between the power receiving element and the power supplying element, the first voltage and the second voltage being based on voltage between the first path and second path at the power receiving element and the power supplying element, respectively;

supplying the output power from the power supplying element;

receiving the output power at a second power supply and providing isolated power to an element housed in the equipment box.

44. The method of claim 43, including:

filtering the input power using a filter designed to minimize voltage drop.

45. The method of claim 43, including:

position the power receiving element adjacent the power supply element.

46. The method of claim 43, including:

designing a component of the first power supply to be aerodynamically efficient.

47. The method of claim 43, including:

orienting a component of the first power supply to optimize aerodynamics of airflow.

48. The method of claim 43, including:

housing components of the first power supply in an air plenum.

49. The method of claim 48, including:

drawing air through the air plenum across the first power supply components.

50. A power supply system, comprising:

a power receiving connector configured to receive input power having a first voltage;

a power supplying connector placed in close proximity to the power receiving connector and configured to supply output power having a second voltage that is slightly lower than the first voltage;

a first electrical path connected between the power receiving connector and the power supplying connector, the first electrical path comprising first parallel cables that transmit current from the power receiving connector to the power supplying connector; and a second electrical path comprising second parallel cables that connect between the power receiving connector and the power supplying connector, the first voltage and the second voltage being based on voltage between the first electrical path and the second electrical path at the power receiving connector and the power supplying connector, respectively.

51. The power supply system of claim 10, further comprising:

a monitor configured to:
   monitor voltage across the power receiving element based on the input power,
   determine whether the monitored voltage is within a predetermined operating range, and
   control the switches to interrupt the connection between the power receiving element and the power supplying element when the monitored voltage becomes outside the predetermined operating range.

52. A power supply, comprising:

a power receiving component configured to receive input power from an outside source;

a power supplying component connected to the power receiving component and configured to transmit output power to a power-isolating component;

a plurality of first parallel cables connected between the power receiving component and the power supplying component;

a plurality of second parallel cables connected between the power receiving component and the power supplying component;

first and second filters connected to the first parallel cables and designed to minimize voltage drop between the power receiving component and the power supplying component;

a third filter connected to the second parallel cables and designed to minimize voltage drop between the power receiving component and the power supplying component;

a monitor configured to monitor voltage across the power receiving component based on the input power and determine whether the monitored voltage is within a predetermined operating range; and a plurality of switches connected to the first parallel cables and configured to be controlled by the monitor to interrupt the connection between the power receiving component and the power supplying component when the monitored voltage becomes outside the predetermined operating range.

* * * * *